(12) United States Patent
Doi et al.

(10) Patent No.: US 8,422,199 B2
(45) Date of Patent: Apr. 16, 2013

(54) ELECTROLYTE SOLUTION AND ELECTROCHEMICAL CAPACITOR USING SAME

(75) Inventors: Shotaro Doi, Osaka (JP); Atsuro Shirakami, Osaka (JP); Kiyohiro Isii, Osaka (JP); Susumu Nomoto, Kyoto (JP); Hideki Shimamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 94 days.

(21) Appl. No.: 13/201,832

(22) PCT Filed: Feb. 15, 2010

(86) PCT No.: PCT/JP2010/000892
§ 371 (c)(1),
(2), (4) Date: Aug. 16, 2011

(87) PCT Pub. No.: WO2010/092829
PCT Pub. Date: Aug. 19, 2010

(65) Prior Publication Data
US 2011/0299224 A1    Dec. 8, 2011

(30) Foreign Application Priority Data
Feb. 16, 2009  (JP) .................................. 2009-032182

(51) Int. Cl.
*H01G 9/035* (2006.01)
(52) U.S. Cl.
USPC ........... 361/505; 361/502; 361/504; 361/517; 361/523; 361/525
(58) Field of Classification Search .................. 361/505, 361/502, 503, 508, 512, 516–519, 523–525, 361/528–529; 29/25.01, 25.03
See application file for complete search history.

(56) References Cited

U.S. PATENT DOCUMENTS

| 5,646,815 | A  | * | 7/1997  | Owens et al. ................. 361/502 |
| 6,210,835 | B1 |   | 4/2001  | Arai |
| 6,491,789 | B2 | * | 12/2002 | Niu ............................... 162/145 |

(Continued)

FOREIGN PATENT DOCUMENTS

| JP | 11-307123    | 11/1999 |
| JP | 2002-033121  | 1/2002  |
| JP | 2002-100403  | 4/2002  |
| JP | 2003-017118  | 1/2003  |
| JP | 2005-166459  | 6/2005  |
| JP | 2005-229103  | 8/2005  |

*Primary Examiner* — Nguyen T Ha
(74) *Attorney, Agent, or Firm* — McDermott Will & Emery LLP

(57) ABSTRACT

The present invention provides an electrolyte highly reliable in charge and discharge in a high voltage condition, and an electrochemical capacitor using the same. The electrolyte of the present invention includes a solvent, an electrolyte salt having an anion having a perfluoro alkyl group represented by a following composition formula, and an acid inducing substance having a fluorine atom for an anion, characterized in that the weight ratio of the acid inducing substance is in a range of 0.0001 to 2.0 wt %:

$$M^{X+}[Q(R_f)_y F_z]^{X-}$$

(wherein Q is a group 13 or group 15 element in the periodic table, $R_f$ is a perfluoro alkyl group ($C_nF_{2n+1}$), n is a natural number, $1 \leq y < 6$, $1 \leq z < 6$, $M^{X+}$ is a cation of Xth valence, and X is a natural number from 1 to 3). Thereby, since excessive electric potential decline of the negative electrode by the electrolyte salt and destruction of the negative electrode protection film by HF are restrained at the same time, deterioration of the cycle characteristics is restrained even in the case of charge and discharge in a high temperature or high voltage condition.

5 Claims, 5 Drawing Sheets

U.S. PATENT DOCUMENTS

| | | | |
|---|---|---|---|
| 6,864,016 B2 * | 3/2005 | Ueda et al. | 429/188 |
| 7,864,508 B2 * | 1/2011 | Fukumine | 361/502 |
| 7,998,615 B2 * | 8/2011 | Matsui et al. | 429/199 |
| 2002/0028389 A1 | 3/2002 | Sonoda et al. | |
| 2004/0013945 A1 | 1/2004 | Ueda et al. | |
| 2005/0158623 A1 | 7/2005 | Matsui et al. | |
| 2012/0003260 A1 * | 1/2012 | Seeberger et al. | 424/194.1 |

* cited by examiner

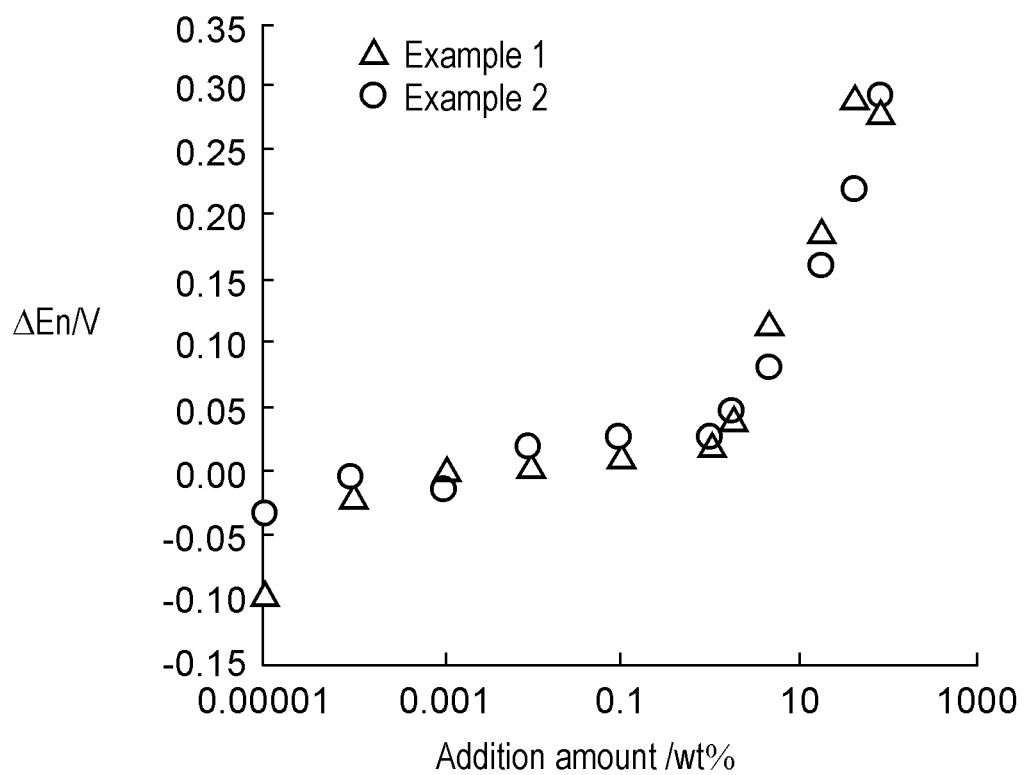

ELECTROLYTE SOLUTION AND ELECTROCHEMICAL CAPACITOR USING SAME

RELATED APPLICATIONS

This application is the U.S. National Phase under 35 U.S.C.§371 of International Application No. PCT/JP2010/000892, filed on Feb. 15, 2010, which in turn claims the benefit of Japanese Application No. 2009-032182, filed on Feb. 16, 2009, the disclosures of which Applications are incorporated by reference herein.

TECHNICAL FIELD

The present invention relates to an electrolyte used for devices as a backup power source, regeneration, or power storage for various electronic appliances, hybrid motorcars, or fuel battery vehicles, and an electrochemical capacitor using the same.

BACKGROUND ART

Conventionally, electric double-layer capacitors attract the attention for their high withstand voltage, large capacity, and furthermore, high reliability in rapid charge and discharge.

Moreover, an electrochemical capacitor having an energy density as high as 4 V upper voltage realized by a carbon material comprising a negative electrode occluding a lithium ion ($Li^+$) has been proposed as a next generation version of the electric double-layer capacitors.

Conventionally, improvement of the cycle characteristics at the time of rapid charge and discharge has been executed by reduction of the production amount of hydrogen fluoride (HF) produced from an electrolyte in a secondary power source using a lithium ion at the time of charge and discharge including the case of the electrochemical capacitor. Specifically, an electrolyte including as an electrolyte salt fluoro alkyl phosphate alone ($LiPF_{6-n}(R)_n$ (wherein n is an integer from 1 to 3, and R is $CF_3$ or $C_2F_5$)), or a mixture in a 1:1 ratio of fluoro alkyl phosphate and $LiPF_6$ or $LiBF_4$ is used (see patent literature 1).

However, according to the secondary power source using the electrolyte salt as a mixture in the ratio mentioned above, since $LiPF_6$ or $LiBF_4$ included therein easily reacts with a minute amount of moisture content in a cell so as to generate HF to such an extent of deteriorating the cycle characteristics.

Then, the produced HF destroys a protection coating film including lithium formed on the surface of the carbon material of the negative electrode. Since the lithium ion occluded in the negative electrode is consumed for the repair of the protection coating film destroyed by the HF, the lithium ion occluded to the negative electrode is reduced so that the electric potential of the negative electrode is increased for causing decline of the withstand voltage of the electrochemical capacitor.

Furthermore, as to a portion without being affected by the destruction by HF in the protection coating film, the film becomes thicker at the time of repairing the broken portion so as to increase the internal resistance of the electrochemical capacitor.

That is, the electrolyte of the mixing ratio mentioned above provides the HF production restraining effect with fluoro alkyl phosphate insufficiently.

On the contrary, an electrolyte using as the electrolyte salt only fluoro alkyl phosphate may be used for an electrochemical capacitor.

In this case, since the fluoro alkyl phosphate has characteristics hardly generating HF even in the case of being decomposed in the electrolyte, HF generation is restrained.

However, in the case of carrying out charge and discharge of the electrochemical capacitor with an excessive voltage of about 4.5 V applied at a high temperature of about 80° C., oxidation reaction of the electrolyte is generated at a positive electrode and at the same time, lithium ion is more occluded inside the negative electrode in the amount according to the charge amount of the positive electrode reaction.

Thereby, the electric potential of the negative electrode is lowered excessively. If charge and discharge operations are repeated in this state, there is a risk of deposition of the lithium ion occluded excessively as lithium metal on the negative electrode surface.

Then, the deposited lithium may break and short-circuit a separator in the vicinity of the negative electrode.

CITATION LIST

Patent Literature
PTL 1 Unexamined Japanese Patent Publication No. 2003-17118

SUMMARY OF THE INVENTION

The present invention provides an electrolyte highly reliable in charge and discharge in a high voltage condition, and an electrochemical capacitor using the same.

The electrolyte of the present invention includes a solvent, an electrolyte salt having an anion having a perfluoro alkyl group represented by the following composition formula, and an acid inducing substance having a fluorine atom for an anion. The weight ratio of the acid inducing substance is in a range of 0.0001 to 2.0 wt % with respect to the sum of the weight of the electrolyte and the acid inducing substance.

$$M^{X+}[Q(R_f)_y F_z]^{X-}$$

(wherein Q is a group 13 or group 15 element in the periodic table, $R_f$ is a perfluoro alkyl group ($C_nF_{2n+1}$), n is a natural number, $1 \leq y < 6$, $1 \leq z < 6$, $M^{X+}$ is a cation of Xth valence, and X is a natural number from 1 to 3).

According to the configuration mentioned above, the electrolyte of the present invention adjusts the amount different from the design initial value of the negative electrode electric potential.

Therefore, not only change of the dope depth representing the occlusion degree of the lithium ion is restrained at the time of charge and discharge so as to prevent capacity reduction and resistance increase, but also an effect of preventing deposition of the lithium metal due to excessive electric potential decline of the negative electrode is obtained.

Moreover, an electrochemical capacitor of the present invention comprises an element having a positive electrode with an electrode part mainly made of a carbon material formed on the surface of an electric power collector made of a metal foil and a negative electrode with an electrode part mainly made of a carbon material occluding a lithium ion formed on the surface of an electric power collector made of a metal foil as a pair of electrodes wound or laminated in a state with a separator interposed between the positive electrode and the negative electrode facing with each other, an electrolyte, and an exterior member for storing the element and the electrolyte. The electrolyte mentioned above includes a solvent, an electrolyte salt having an anion having a perfluoro alkyl group represented by the following composition formula, and an acid inducing substance having a fluorine atom for an anion. It is characterized in that the weight ratio of the acid inducing substance is in a range of 0.0001 to 2.0 wt % with respect to the sum of the weight of the electrolyte salt and the acid inducing substance.

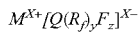

(wherein Q is a group 13 or group 15 element in the periodic table, $R_f$ is a perfluoro alkyl group ($C_nF_{2n+1}$), n is a natural number, $1 \leq y < 6$, $1 \leq z < 6$, $M^{X+}$ is a cation of Xth valence, and X is a natural number from 1 to 3).

BRIEF DESCRIPTION OF DRAWINGS

FIG. 3 is a characteristic graph showing the electric potential change of the negative electrode with respect to the mixing ratio of the electrolyte and the acid inducing substance in the electrolyte in this embodiment.

DESCRIPTION OF EMBODIMENTS

Hereafter, embodiments of the present invention will be explained with reference to the drawings and tables, however, the present invention is not limited to the configurations mentioned below.

Figure 1:
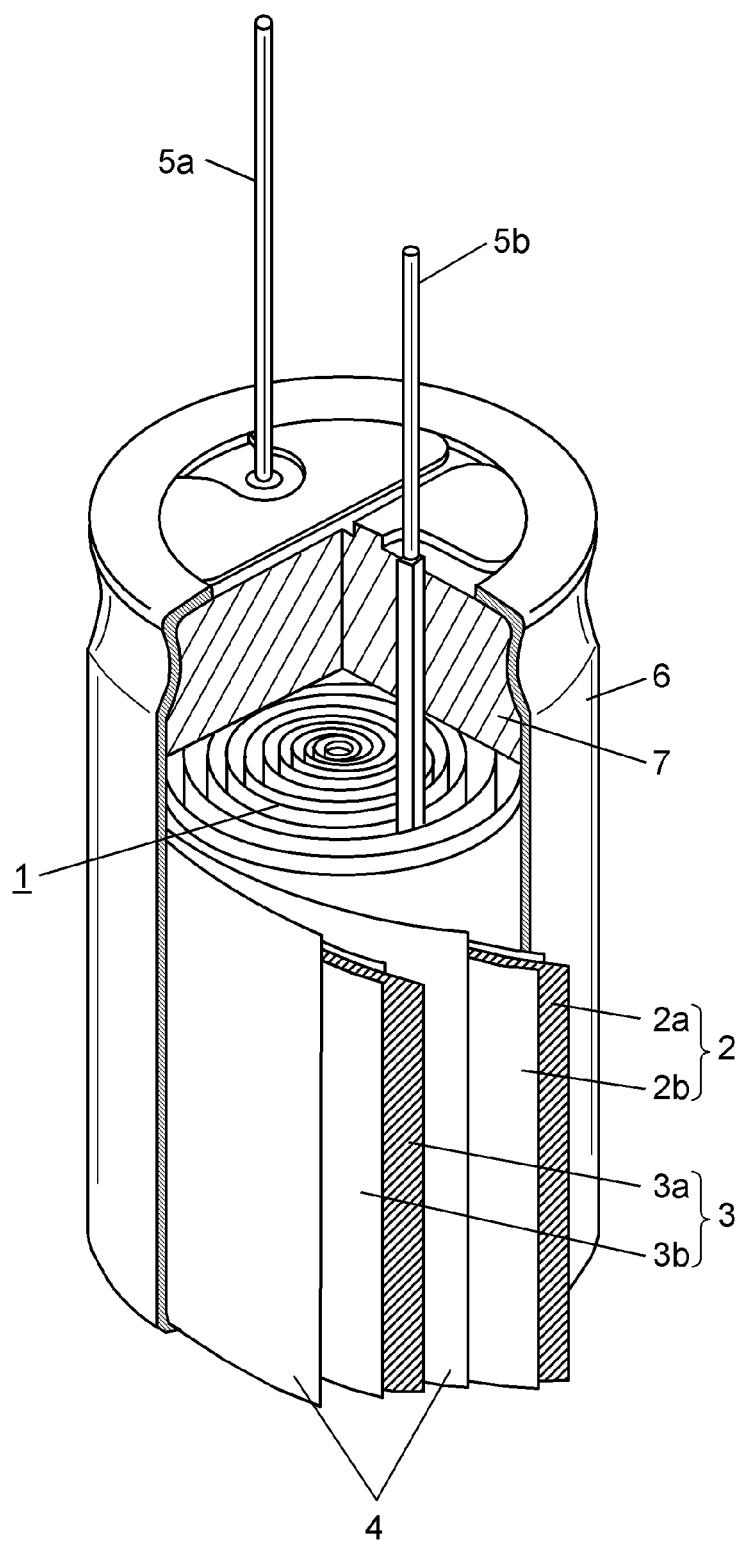
FIG. 1 is a partially notched perspective view showing the configuration of an electrochemical capacitor using an electrolyte of an embodiment.

FIG. 1 is a partially notched perspective view showing the configuration of an electrochemical capacitor of this embodiment.

In FIG. 1, element 1 has positive electrode 2 and negative electrode 3 as a pair of electrodes wound or laminated in a state with separator 4 interposed between positive electrode 2 and negative electrode 3 facing with each other. Positive electrode 2 has polarizable electrode layer 2b made of activated carbon, and the like, formed on the surface of electric power collector 2a made of a metal. Negative electrode 3 (negative electrode for an electrochemical capacitor) has as an electrode part carbon electrode layer 3b mainly made of a carbon material including a multiple layer crystal structure formed with an interlayer on the surface of electric power collector 3a made of copper. In a state with lead lines 5a, 5b each connected as a leading out terminal with the surface of positive electrode 2 and negative electrode 3, element 1 and electrolyte 8 (not shown) are stored in exterior case 6 of a cylindrical shape with a bottom as an exterior member. The open end part of exterior case 6 is sealed with aperture sealing member 7 so that lead lines 5a, 5b are exposed.

Here, an assembly method of the electrochemical capacitor in the present invention will be explained.

First, a production method for positive electrode 2 will be described. While using a high purity aluminum foil (AL: 99.30% or higher) of a 22 μm thickness is used as electric power collector 2a, the surface is roughed by electrolytic etching in a hydrochloric acid etching solution.

Then, a phenol resin-based activated carbon powder of about a 5 μm average particle size, acetylene black of a 0.5 μm average particle size as a conductivity providing agent, and a water soluble binder solution prepared by dissolving carboxy methyl cellulose (CMC) and polytetrafluoro ethylene (PTFE) are mixed in a 10:2:1 weight ratio so as to be kneaded sufficiently with a kneader. While adding water little by little, the kneaded mixture is further kneaded for producing a paste with a predetermined viscosity. Polarizable electrode layer 2b is formed by applying the paste to the front and back surfaces of electric power collector 2a and drying the same in the atmosphere of 85° C. Thereafter, by cutting the same into a predetermined size, positive electrode 2 is obtained.

As the material for electric power collector 2a, in addition to the above-mentioned, Ti, Zr, Hf, Nb, Ta, Cr, Mo, W, Mn, Si, Fe, Ag, Pd, Ni, Cu, Pt, Au or an alloy thereof may also be used. As the material for polarizable electrode layer 2b, in addition to the above-mentioned, petroleum coke based, coal based, coco peat based, artificial black lead, natural black lead, a hardly graphitizable material may be used. As to the activating process method of these materials, water vapor activation, alkaline activation, electrolytic activation, and the like may be used.

Next, a production method for negative electrode 3 will be described. Using a 15 μm copper foil as electric power collector 3a, carbon electrode layer 3b is formed on the front and back surfaces of electric power collector 3a using a carbon material called a graphitizable carbon material baked in a temperature range of 1,500° C. to 2,000° C.

Carbon electrode layer 3b includes the materials in the ratio of graphitizable carbon:acetylene black:binder=95:3:2. Moreover, the binder includes one including stylene butadiene latex (SBR) and CMC in a 1:4 ratio.

Furthermore, as to the production method, a paste is produced by adding to water in the order of CMC, acetylene black, graphitizable carbon, and SBR, agitating and kneading. The paste is applied onto the front and back surfaces of electric power collector 3a using a comma coater, a die coater, and the like. Thereafter, by drying the same at 85° C. and then executing a press process, carbon electrode layer 3b having a 0.7 to 1.3 g/cm³ electrode density and 95% content of the graphitizable carbon is formed. Finally, by cutting the same into a predetermined size, negative electrode 3 is obtained.

As the material for electric power collector 3a, in addition to the above-mentioned Ti, Zr, Hf, Nb, Ta, Cr, Mo, W, Mn, Si, Fe, Ag, Pd, Ni, Cu, Pt, Au or an alloy thereof may also be used.

Moreover, as the material for carbon electrode layer 3b, in addition to the above-mentioned, black lead, low temperature baked carbon, a hardly graphitizable material, and the like may be used as well.

Pre-doping is carried out for preliminarily occluding a lithium ion to negative electrode 3 after production of negative electrode 3.

In this embodiment, the pre-doping operation is carried out by applying a foil-like lithium metal on the surface of negative electrode 3 and impregnating the same in electrolyte 8 after formation of element 1. For separator 4, for example, a cellulose based paper with about a 35 μm thickness and a 0.45 g/cm³ density is used. For separator 4, in addition, polypropylene, polyethylene terephthalate, polyethylene, Teflon, or another resin material may be used.

Element 1 is formed by winding separator 4 in a state interposed between positive electrode 2 and negative electrode 3.

Lead line 5a for the positive electrode and lead line 5b for the negative electrode each for connection with an external circuit of positive electrode 2 and negative electrode 3 are connected each with a portion without formation of polarizable electrode layer 2b or carbon electrode layer 3b on electric power collectors 2a, 3a, that is, a portion with preliminarily provided electric power collectors 2a, 3a exposed so as to be connected with an external circuit. Therefore, for reducing as much as possible the connection resistance with positive electrode electric power collector 2a and negative electrode electric power collector 3a, as the members for lead lines 5a, 5b, for example, aluminum is used for positive electrode lead line 5a, copper, nickel or copper with nickel plating applied is used for negative electrode lead line 5b. However, a means for connecting with the external circuit is not limited to lead lines 5a, 5b mentioned above.

Exterior case 6 has a cylindrical shape with a bottom for storing element 1 connected with lead lines 5a, 5b, and electrolyte 8 with element 1 impregnated. As the substrate for exterior case 6, from the viewpoint of processability, and the like, for example, aluminum or stainless steel is used.

The shape of exterior case 6 may be a rectangular tube or a laminate type, and thus it is not particularly limited to the cylindrical shape with a bottom mentioned above.

For electrolyte 8, an anion having a fluoro alkyl phosphate such as $LiPF_3(C_2F_5)_3$ as an electrolyte salt, and an anion having a hexafluoro phosphoric acid ion such as $LiPF_6$ as an acid inducing substance are used. One prepared by adding $LiPF_6$ in a 0.0001 to 2.0 wt % ratio to the weight sum of $LiPF_3(C_2F_5)_3$ and $LiPF_6$ is used.

In addition to the above-mentioned, the electrolyte salt may be a compound represented by a composition formula mentioned below.

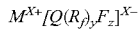

(wherein Q is a group 13 or group 15 element in the periodic table, $R_f$ is a perfluoro alkyl group $(C_nF_{2n+1})$, $1 \leq y < 6$, $1 \leq z < 6$, $M^{X+}$ is a cation of Xth valence, and X is a natural number from 1 to 3).

As to the specific examples of the electrolytes represented by the composition formula, in the case where M is Li (lithium) and Q is P (phosphorus atom), $LiPF(C_2F_5)_5$, $LiPF_2(C_2F_5)_4$, $LiPF_4(C_2F_5)_2$, $LiPF_5(C_2F_5)$, $LiPF(CF_3)_5$, $LiPF_2(CF_3)_4$, $LiPF_3(CF_3)_3$, $LiPF_4(CF_3)_2$, $LiPF_5(CF_3)$, and the like may be used. In the case where Q is B (boron), $LiBF(C_2F_5)_3$, $LiBF_2(C_2F_5)_2$, $LiBF_3(C_2F_5)$, $LiBF(CF_3)_3$, $LiBF_2(CF_3)_2$, $LiBF_3(CF_3)$, and the like may be used. Moreover, as the acid inducing substance, in addition to the above-mentioned, $LiBF_4$, $LiAsF_6$, $LiSbF_6$, $LiAlF_4$, and the like, and a mixture thereof may be used.

Moreover, as the solvent for electrolyte 8, a solvent mixture prepared by mixing ethylene carbonate of a high dielectric constant and a dimethyl carbonate of a low viscosity in a 1:1 volume ratio is used.

As the solvent, in addition to the above-mentioned, ethyl methyl carbonate, diethyl carbonate, propylene carbonate, and a solvent mixture thereof may be used.

Finally, the pair of positive and negative lead lines 5a, 5b accordingly led out from element 1 inserted into exterior case 6 together with electrolyte 8 is inserted through a hole provided in aperture sealing member 7 so that aperture sealing member 7 is fitted into an opening part of exterior case 6. Then, it is sealed by applying a drawing process to the external periphery in the vicinity of the opening part of exterior case 6 inward into a circular shape and applying a curling process to the opening end of exterior case 6. As mentioned above, the electrochemical capacitor of this embodiment is assembled.

Figure 2A:
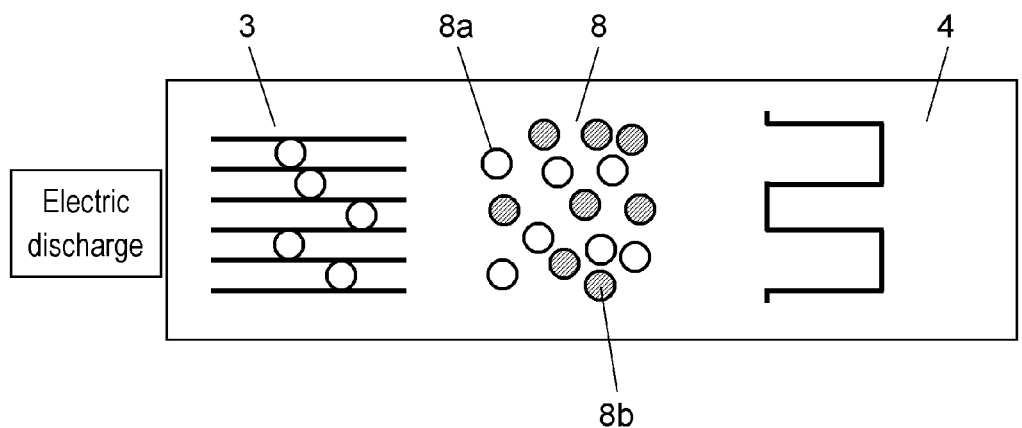
FIG. 2A is a conceptual diagram showing an electric discharge state of an electrochemical capacitor using an electrolyte of this embodiment.
Figure 2B:
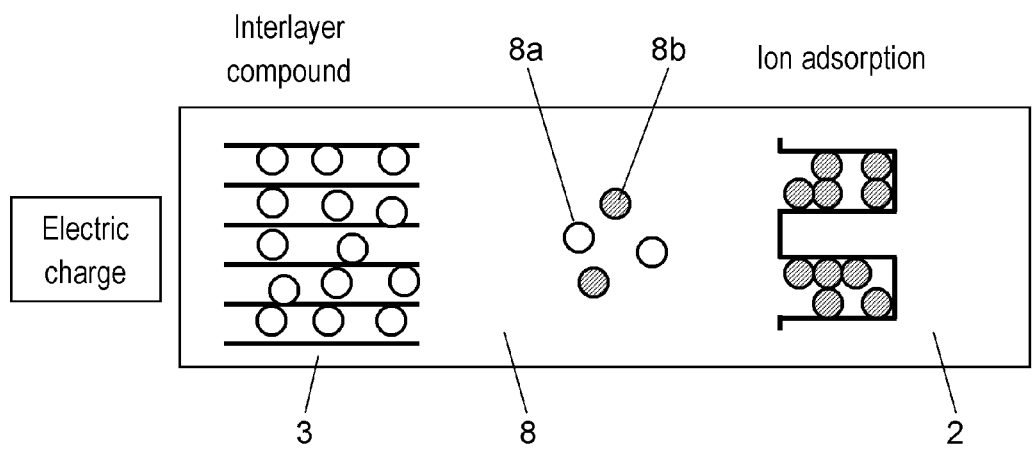
FIG. 2B is a conceptual diagram showing an electric charge state of the electrochemical capacitor using the electrolyte of this embodiment.

Next, the principle of charge and discharge of the electrochemical capacitor of this embodiment will be explained. FIG. 2A is a conceptual diagram showing an electric discharge state of the inside of the electrochemical capacitor of the embodiment. FIG. 2B is a conceptual diagram showing an electric charge state of the inside of the electrochemical capacitor of this embodiment.

As shown in FIGS. 2A and 2B, in the electrochemical capacitor, the charge and discharge operations are executed by movement of cations 8a and anions 8b of the electrolyte salt included in electrolyte 8. However, for obtaining a large capacitance, only the amount of cations 8a in electrolyte 8 is insufficient for the absolute amount so that it is required to preliminarily occlude cations 8a on carbon electrode layer 3b of negative electrode 3 as shown in the electric discharge state of FIG. 2A.

The process of preliminarily occluding cations 8a inside negative electrode 3 is called pre-doping.

Occlusion in this case means a phenomenon of having lithium ions in the vicinity of negative electrode 3 enter into the interlayer of a multilayer crystal structure made of carbon of the carbon material comprising carbon electrode layer 3b for producing an interlayer compound. At the time of the phenomenon, the electrode potential of negative electrode 3 is lowered by the electrochemical reaction of the lithium ions so as to obtain a high withstand voltage owing to the electric potential difference with respect to positive electrode 2. Then, the energy density of the electrochemical capacitor proportional to the square of the withstand voltage can be improved.

Although the invention of pre-doping the negative electrode has been disclosed also in the field of the lithium ion secondary battery, the purpose of the pre-doping operation in the lithium ion secondary battery is to improve the charge and discharge capacitance by reducing the irreversible capacitance of the negative electrode in the charge and discharge cycle.

On the other hand, the purpose of the pre-doping operation of the electrochemical capacitor of this embodiment is to improve the withstand voltage by the electric potential decline of negative electrode 3. Depending on the purpose, the lithium ion occlusion amount at the time of pre-doping differs. Since the ion occlusion amount for the lithium ion secondary battery is only for the irreversible capacitance of negative electrode 3, the lithium ion occlusion amount is apparently smaller than that of the electrochemical capacitor.

As to the pre-doping method of the lithium ions, in addition to the method of using a lithium metal foil as in this embodiment, various methods such as a transfer method of attaching a lithium metal film formed by deposition on a sheet-like substrate onto the surface of negative electrode 3 and then removing the substrate, a method of impregnating element 1 with an electrolyte 8 having lithium ions as cation 8a and applying a voltage to positive electrode 2 and negative electrode 3 of element 1 for occluding the lithium ions in the electrolyte inside the carbon material can be presented.

Therefore, the pre-doping method is not particularly limited to the method of this embodiment.

Here, in this embodiment, as the electrolyte salt included in electrolyte 8, the electrolyte salts represented by the following composition formula may be used.

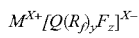

$$M^{X+}[Q(R_f)_yF_z]^{X-}$$

(wherein Q is a group 13 or group 15 element in the periodic table, Rf is a perfluoro alkyl group ($C_nF_{2n+1}$), n is a natural number, $1 \leq y < 6$, $1 \leq z < 6$, $M^{X+}$ is a cation of Xth valence, and X is a natural number from 1 to 3).

Furthermore, in this embodiment, as the additive for the above-mentioned electrolyte salt, an acid inducing substance including a fluorine atom in the anion with hydrolysis reactivity higher than that of the electrolyte salt is included in electrolyte 8 in the weight ratio of the acid inducing substance being in a range of 0.0001 to 2.0 wt % with respect to the sum of the weight of the electrolyte and the acid inducing substance.

By use of electrolyte 8 of the above-mentioned configuration, an effect of restraining the excessive electric potential decline generated in negative electrode 3 is achieved.

As an important condition for enabling the effect, the addition amount of the above-mentioned acid inducing substance is present.

In this embodiment, the acid inducing substance is included in electrolyte 8 with the weight ratio of the acid inducing substance being in a range of 0.0001 to 2.0 wt % with respect to the sum of the weight of the electrolyte salt and the acid inducing substance.

Since electrolyte 8 of the above-mentioned configuration is used in the electrochemical capacitor of this embodiment, the anion of the above-mentioned acid inducing substance included by only a minute amount as the additive is hydrolyzed in positive electrode 2 in the charge and discharge operation so as to generate HF.

Then, by intentionally having HF destroy the protection coating film of negative electrode 3, the lithium ions occluded in negative electrode 3 is consumed for repair of the protection coating film so that an effect of restraining excessive electric potential decline generated in negative electrode 3 by the above-mentioned electrolyte salt is enabled. In the case where the acid inducing substance is included in the electrolyte salt by more than 2.0 wt %, influence of the protection coating film destruction by generated HF is stronger so as to consume the lithium ions from the inside of negative electrode 3 in a large amount for production of the protection coating film for raising the electric potential of negative electrode 3, and thus it is not preferable. Moreover, in the case where the acid inducing substance amount is less than 0.0001 wt %, production of HF is not enabled for the amount sufficient for destroying the protection coating film so that the lithium is occluded excessively in negative electrode 3 so as to generate a risk of deposition as a metal lithium while repeating the charge and discharge operations, and thus it is not preferable.

For the acid inducing substance, in particular, $LiPF_6$ and $LiBF_4$ are preferable because $LiPF_6$ and $LiBF_4$ play a role of the acid inducing substance, and at the same time, they includes $Li^+$ for the cations so as to also play a role of the electrolyte salt.

Moreover, as the acid inducing substance, $LiAsF_6$, $LiSbF_6$, and the like may be used as well.

Furthermore, the acid inducing substance in this embodiment is not limited to the substances having $Li^+$ as the cations so that a tertiary ammonium salt, an imidazolium salt, a tertiary phosphonium salt, and the like may be used.

As the acid inducing substance in this embodiment, those having hydrolysis reactivity higher than that of the electrolyte salt are preferable.

Therefore, anions comprising the acid inducing substance having hydrolysis reactivity higher than that of the electrolyte salt such as $PF_6^-$, $BF_4^-$, $AsF_6^-$, and $SbF_6^-$ are preferable. The cations comprising the acid inducing substance are not particularly limited.

Moreover, although $LiPF_3(C_2F_5)_3$ is used as the electrolyte salt in this embodiment, it is not limited thereto. Any electrolyte salt comprising an anion having at least one perfluoro alkyl group comprising carbon and fluorine atom may be used as the electrolyte salt of this embodiment having a low hydrolysis reactivity.

Then, the cations of the above-mentioned electrolyte salt is not limited to $Li^+$, and it may be Na, K, Mg, Rb, Cs, an aromatic heterocyclic cation, and the like. The aromatic heterocyclic cation means a cation comprising a cyclic structure with respect to a cyclic structure like a benzene while including an atom different from the carbon in the cyclic structure.

From the reasons mentioned above, the electrolyte salt in this embodiment may be one represented by the above-mentioned composition formula.

Depending on the cation and anion used, a configuration of the electrolyte salt represented by the above-mentioned composition formula without a single ion with different number of ion valence is conceivable. In this case, while optionally adjusting the ion number of the cation and anion, it may be used as the electrolyte salt.

For example, if the cation is of α valence and the anion is of β valence, the electrolyte salt thereof includes as a salt, β cation atoms (or molecules) and α anion atoms (or molecules).

As to the degree of the reactivity with respect to hydrolysis of the electrolyte salt and the acid inducing substance in this embodiment, it is judged by each extracting from electrolyte 8 using a liquid chromatography, and adding a certain amount of water to the extracted electrolyte salt and acid inducing substance for comparing the degree of reduction of the added water after passage of a certain time.

With a larger amount of the water reduction, it is judged to have a higher reactivity with respect to hydrolysis.

Moreover, the mixing ratio of the electrolyte salt and the acid inducing substance can be confirmed by use of the above-mentioned liquid chromatography or FT-IR (Fourier transformation type infrared spectroscope).

The range of the addition amount of the acid inducing substance will be explained again in the following performance evaluation test.

As mentioned above, the electrolyte salt in this embodiment restrains excessive electric potential decline of negative electrode 3 owing to the electrolyte salt having a perfluoro alkyl group, and furthermore, $PF_6^-$ or $BF_4^-$ restrains destruction of the protection coating film by HF generated by the hydrolysis.

Therefore, even in the case of using the electrochemical capacitor while applying a high voltage in a high temperature, it can be used stably with little characteristic change.

The effect of the present invention is enabled only by preparing electrolyte 8 while recognizing the problem of lithium deposition by the excessive electric potential decline generated in negative electrode 3 in the case of using an electrolyte salt comprising an anion for a perfluoro alkyl group, and mixing the above-mentioned electrolyte salt and the above-mentioned acid inducing substance in consideration to the difference of their effects.

(Performance Evaluation Test)

Here, a performance evaluation test is executed using the electrochemical capacitor of this embodiment.

As Example 1, an electrochemical capacitor with electrolyte 8 prepared by using $LiPF_3(C_2F_5)_3$ as the electrolyte and $LiPF_6$ as the acid inducing substance with the weight ratio of $LiPF_6$ being in a range of 0.0001 to 2.0 wt % with respect to the sum of the weight of the electrolyte salt and $LiPF_6$ is used.

Moreover, as Example 2, an electrochemical capacitor with electrolyte 8 prepared by using $LiPF_3(C_2F_5)_3$ as the electrolyte salt and $LiBF_4$ as the acid inducing substance with the weight ratio of $LiBF_4$ being in a range of 0.0001 to 2.0 wt % with respect to the sum of the electrolyte salt and $LiBF_4$ is used.

For Examples 1, 2, in this test, charge and discharge operations are carried out in 2,000 cycles so that the change of the capacitance of the electrochemical capacitors, the internal resistance, and the negative electrode electric potential are measured after the 2,000 cycles. Results of Examples 1, 2 are shown in Tables 1, 2, respectively.

The load condition at the time of the cycles are a 4.5 V maximum applied voltage of the cell, a 3 V lower limit voltage, and a 80° C. cell surface temperature with a 0.2 A charge and discharge current at the time of the cycles.

The capacitance and the resistance are measured after charging the electrochemical capacitors in a 80° C. constant temperature vessel by a constant current I to a first predetermined voltage V1, carrying out a constant voltage charge by the first predetermined voltage V1 for 30 minutes, and then carrying out a discharge to a second predetermined voltage V2 by a constant current I. Here, the relationship V1>V2>0 is satisfied.

The capacitance C is calculated with the following [formula 1] from the charge amount Q at the time of discharge, the voltage lowered immediately after the start of the discharge ΔV, the first predetermined voltage V1 and the second predetermined voltage V2.

$$C=Q/(V1-V2-\Delta V) \qquad \text{[formula 1]}$$

The resistance R is calculated with the following [formula 2] from the voltage lowered immediately after the start of the discharge ΔV, and the discharge current I.

$$R=\Delta V/I \qquad \text{[formula 2]}$$

TABLE 1

| Mixing ratio of $LiPF_6$ with respect to $LiPF_3$ $(C_2F_5)_3$ (wt %) | Resistance (Ω) | | Capacitance (F) | | Negative electrode electric potential En at the time of 4 V cell voltage (V vs. Li/Li⁺) | | Potential Change ΔEn (V) |
|---|---|---|---|---|---|---|---|
| | Initial | 2,000 cycles | Initial | 2,000 cycles | Initial | 2,000 cycles | |
| 0 | 0.863 | 0.926 | 0.524 | 0.481 | 0.201 | 0.077 | −0.124 |
| 0.00001 | 0.856 | 0.896 | 0.489 | 0.445 | 0.149 | 0.055 | −0.094 |
| 0.0001 | 0.816 | 0.889 | 0.499 | 0.438 | 0.178 | 0.160 | −0.018 |
| 0.001 | 0.821 | 0.855 | 0.552 | 0.506 | 0.169 | 0.172 | 0.003 |
| 0.01 | 0.855 | 0.902 | 0.561 | 0.508 | 0.177 | 0.182 | 0.005 |
| 0.1 | 0.802 | 0.880 | 0.544 | 0.489 | 0.178 | 0.186 | 0.008 |
| 1 | 0.701 | 0.799 | 0.538 | 0.502 | 0.168 | 0.185 | 0.017 |
| 2 | 0.762 | 0.825 | 0.499 | 0.469 | 0.160 | 0.200 | 0.040 |
| 5 | 0.702 | 0.954 | 0.544 | 0.400 | 0.125 | 0.240 | 0.116 |
| 20 | 0.659 | 1.180 | 0.485 | 0.412 | 0.196 | 0.382 | 0.186 |
| 50 | 0.770 | 2.698 | 0.665 | 0.351 | 0.153 | 0.446 | 0.293 |
| 100 | 0.758 | 1.649 | 0.642 | 0.442 | 0.138 | 0.420 | 0.282 |

TABLE 2

| Mixing ratio of $LiPF_4$ with respect to $LiPF_3$ $(C_2F_5)_3$ (wt %) | Resistance (Ω) | | Capacitance (F) | | Negative electrode electric potential En at the time of 4 V cell voltage (V vs. Li/Li⁺) | | Potential Change ΔEn (V) |
|---|---|---|---|---|---|---|---|
| | Initial | 2,000 cycles | Initial | 2,000 cycles | Initial | 2,000 cycles | |
| 0 | 0.863 | 0.926 | 0.524 | 0.481 | 0.201 | 0.077 | −0.124 |
| 0.00001 | 0.826 | 0.910 | 0.556 | 0.502 | 0.112 | 0.079 | −0.033 |
| 0.0001 | 0.698 | 0.820 | 0.589 | 0.512 | 0.125 | 0.120 | −0.005 |
| 0.001 | 0.886 | 0.905 | 0.528 | 0.499 | 0.112 | 0.102 | −0.010 |
| 0.01 | 0.726 | 0.786 | 0.568 | 0.523 | 0.122 | 0.138 | 0.016 |
| 0.1 | 0.625 | 0.708 | 0.529 | 0.485 | 0.117 | 0.142 | 0.025 |
| 1 | 0.656 | 0.726 | 0.536 | 0.500 | 0.110 | 0.134 | 0.024 |
| 2 | 0.705 | 0.758 | 0.623 | 0.548 | 0.111 | 0.154 | 0.043 |
| 5 | 0.778 | 0.923 | 0.586 | 0.456 | 0.120 | 0.203 | 0.083 |
| 20 | 0.639 | 0.901 | 0.503 | 0.373 | 0.113 | 0.276 | 0.163 |

TABLE 2-continued

| Mixing ratio of LiPF$_4$ with respect to LiPF$_3$(C$_2$F$_5$)$_3$ (wt %) | Resistance (Ω) | | Capacitance (F) | | Negative electrode electric potential En at the time of 4 V cell voltage (V vs. Li/Li$^+$) | | Potential Change ΔEn (V) |
|---|---|---|---|---|---|---|---|
| | Initial | 2,000 cycles | Initial | 2,000 cycles | Initial | 2,000 cycles | |
| 50 | 0.811 | 1.088 | 0.571 | 0.421 | 0.116 | 0.339 | 0.223 |
| 100 | 1.220 | 2.100 | 0.612 | 0.381 | 0.128 | 0.423 | 0.295 |

FIG. 3 is a graph showing the relationship of the mixing ratio of the acid inducing substance the electric potential change of the negative electrode in Examples 1, 2.

From Table 1 and FIG. 3, in both Examples 1, 2, the electric potential change in the negative electrode is remarkably restrained with the mixing ratio of the acid inducing substance of 0.0001 to 2.0 wt %. Those with the other mixing ratios, the electric potential of the negative electrode have the negative electrode potential raised or lowered.

Moreover, if the acid inducing substance amount is increased to more than 2.0 wt %, not only the negative electrode electric potential is raised but also the capacitance after the 2,000 cycles is lowered so that the internal resistance is increased.

Furthermore, it is also confirmed that if the charge and discharge cycle is repeated while restraining the addition amount of the acid inducing substance to less than 0.0001 wt % in consideration to the negative electrode electric potential rise, the capacitance decline after the 2,000 cycles, and the internal resistance increase mentioned above, the effect of the negative electrode electric potential decline is reinforced so as to lower the negative electrode electric potential.

From this, it is confirmed that the mixing ratio of the electrolyte salt and the acid inducing substance should be determined so that the weight of the acid inducing substance is 0.0001 to 2.0 wt % with respect to the sum of the weight of the electrolyte salt and the acid inducing substance regardless of the composition of the acid inducing substance.

In general, it is known that the negative electrode protection coating film is destroyed by HF. As shown in FIG. 3, the range capable of maintaining the balance of the protection coating film destruction and the negative electrode electric potential excessive decline is constant regardless of the composition of the acid inducing substance.

It is considered that the minute amount moisture content included in the electrolyte is in general administered to about 20 ppm or less by sufficient dehydration so that if the concentration of the acid inducing substance is only a minute amount of 2.0 wt % or less, the predominant factor of the HF production amount is considered to be the minute amount moisture content included in the electrolyte, and thus if the acid inducing substance concentration is a little amount of 0.0001 wt % or less, HF is not produced for an amount sufficient for destroying the protection coating film.

Therefore, as in this embodiment, the mixing ratios of the electrolyte salt and the acid inducing substance for stabilizing the electric potential fluctuation and the cycle characteristics are similar in Examples 1, 2.

Therefore, the numerical value range of 0.0001 to 2.0 wt % is a numerical value change necessary for adjusting the HF generation.

From the above-mentioned, it is considered that the mixing ratio for obtaining the same effect is same for AsF$_6^-$ or SbF$_6^-$ which have not been used in Examples of the performance evaluation test.

Figure 4A:
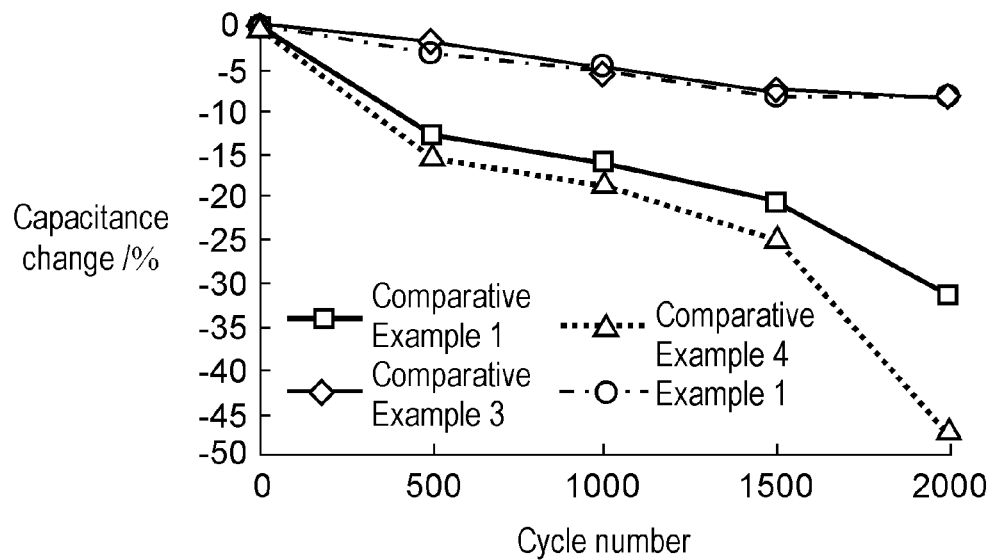
FIG. 4A is a characteristic graph showing the capacitance change with respect to the number of the charge and discharge operations of the electrochemical capacitor using the electrolyte salt with $LiPF_6$ used for an additive in the present invention and an electrochemical capacitor using a conventional electrolyte.
Figure 4B:
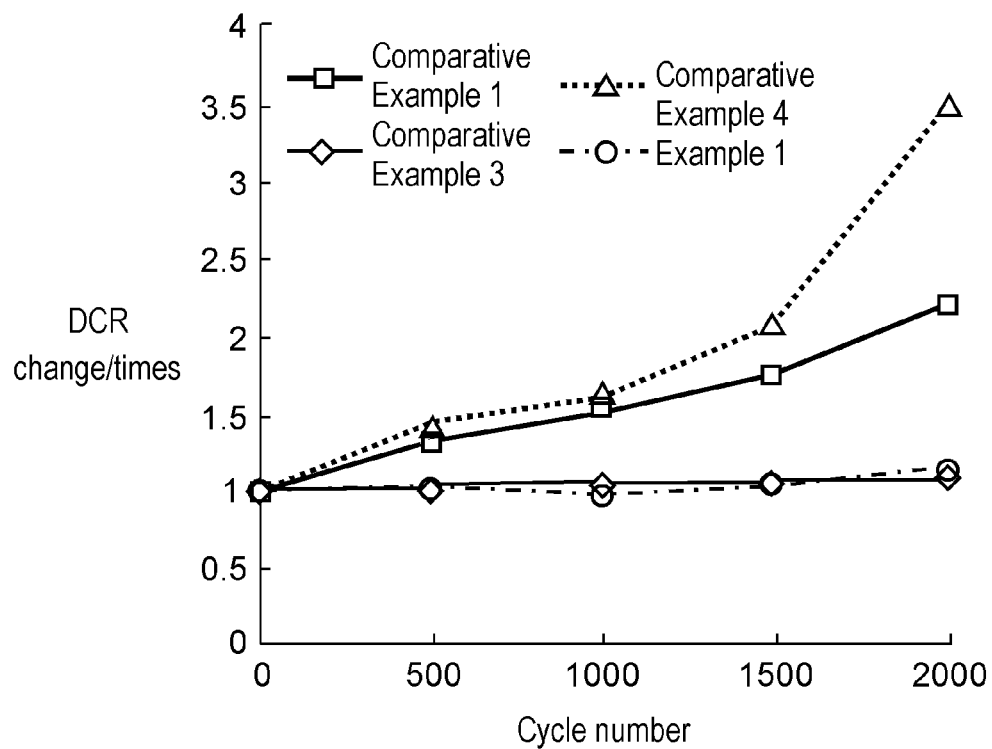
FIG. 4B is a characteristic graph showing the internal resistance change with respect to the number of the charge and discharge operations of the electrochemical capacitor using the electrolyte salt with $LiPF_6$ used for an additive in the present invention and an electrochemical capacitor using a conventional electrolyte.
Figure 4C:
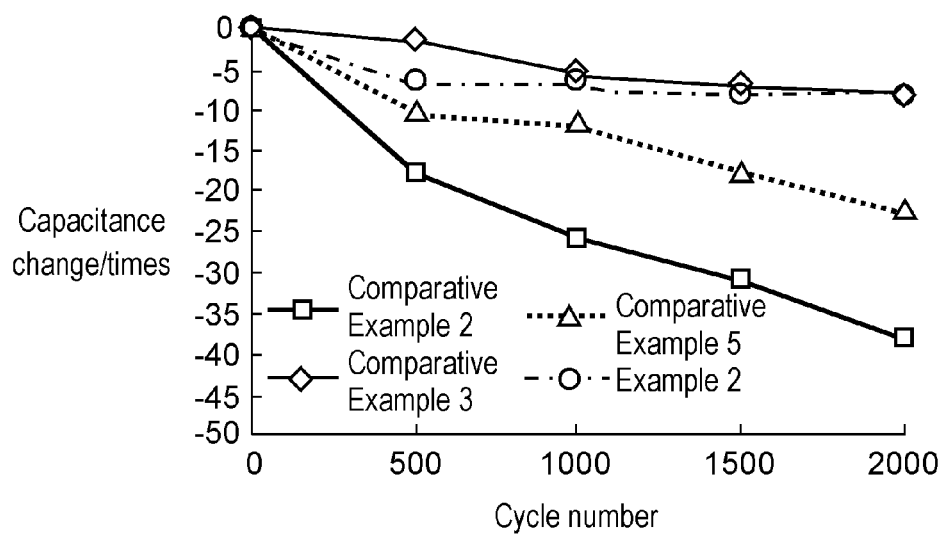
FIG. 4C is a characteristic graph showing the capacitance change with respect to the number of the charge and discharge operations of the electrochemical capacitor using the electrolyte salt with $LiBF_4$ used for an additive in the present invention and an electrochemical capacitor using a conventional electrolyte.
Figure 4D:
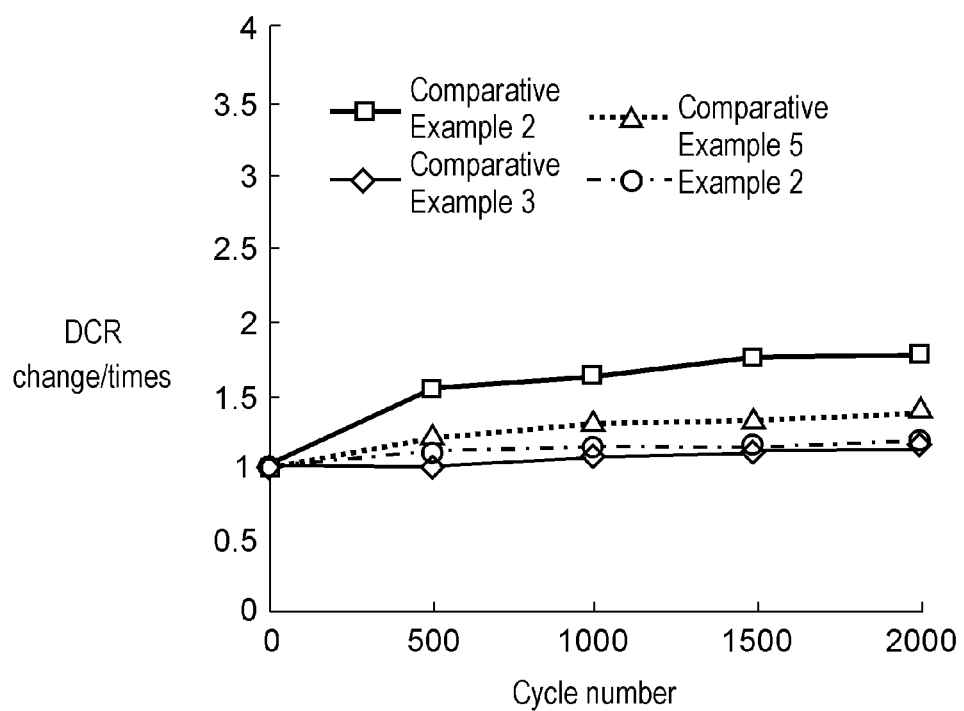
FIG. 4D is a characteristic graph showing the internal resistance change with respect to the number of the charge and discharge operations of the electrochemical capacitor using the electrolyte salt with $LiBF_4$ used for an additive in the present invention and an electrochemical capacitor using a conventional electrolyte.

FIG. 4A is a characteristic graph showing the capacitance change of the electrochemical capacitor with respect to the charge and discharge cycles in Example 1 and Comparative Examples 1, 3, 4. FIG. 4B is a characteristic graph showing the internal resistance (DCR) change of the electrochemical capacitor with respect to the charge and discharge cycles in Example 1 and Comparative Examples 1, 3, 4. FIG. 4C is a characteristic graph showing the capacitance change of the electrochemical capacitor with respect to the charge and discharge cycles in Example 2 and Comparative Examples 2, 3, 5. FIG. 4D is a characteristic graph showing the internal resistance (DCR) change of the electrochemical capacitor with respect to the charge and discharge cycles in Example 2 and Comparative Examples 2, 3, 5. In FIGS. 4A and 4C, the vertical axis represents the capacitance change (%), and the lateral axis represents the number of the charge and discharge cycles (cycle number). Moreover, in FIGS. 4B and 4D, the vertical axis represents the DCR change (times), and the lateral axis represents the number of the charge and discharge cycles (cycle number).

As to Examples shown in FIGS. 4A to 4D, an electrochemical capacitor with LiPF$_6$ added by 0.1 wt % to LiPF$_3$(C$_2$F$_5$)$_3$ as the electrolyte salt is used in Example 1. Moreover, an electrochemical capacitor with LiBF$_4$ added by 0.1 wt % to LiPF$_3$ (C$_2$F$_5$)$_3$ as the electrolyte salt is used in Example 2.

As Comparative Example 1 with respect to Examples 1, 2, an electrochemical capacitor having the same configuration as that of Examples 1, 2 except that only LiPF$_6$ is used for the electrolyte salt and the acid inducing substance is not added is used.

Then, as Comparative Example 2, an electrochemical capacitor having the same configuration as that of Examples 1, 2 except that only LiBF$_4$ is used for the electrolyte salt and the acid inducing substance is not added is used.

As Comparative Example 3, an electrochemical capacitor having the same configuration as that of Examples 1, 2 except that only LiPF$_3$(C$_2$F$_5$)$_3$ is used for the electrolyte salt and the acid inducing substance is not added is used.

As Comparative Example 4, an electrochemical capacitor having the same configuration as that of Examples 1, 2 except that an electrolyte prepared by mixing LiPF$_6$ by a 50 wt % ratio to LiPF$_3$(C$_2$F$_5$)$_3$ is used is used.

As Comparative Example 5, an electrochemical capacitor having the same configuration as that of Examples 1, 2 except that an electrolyte prepared by mixing LiBF$_4$ by a 50 wt % ratio to LiPF$_3$(C$_2$F$_5$)$_3$ is used is used.

FIGS. 4A, 4B show that Example 1 has little capacitance and internal resistance (DCR) change from the start of the charge and discharge operation to the end of 2,000 cycles compared with Comparative Examples 1, 3, 4.

Similarly, FIGS. 4C, 4D show that Example 2 has little capacitance and internal resistance (DCR) change from the start of the charge and discharge operation to the end of 2,000 cycles compared with Comparative Examples 2, 3, 5.

From the above-mentioned, it is confirmed that although the acid inducing substance is added thereto, Examples 1, 2 restrain the negative electrode electric potential change without deteriorating the characteristic stability effect of the electrolyte salt of an anion comprising a perfluoro alkyl group as in Comparative Example 3.

From the above-mentioned, the electrolyte of the present invention and the electrochemical capacitor using the same are characterized in that an electrolyte salt comprising an anion having a perfluoro alkyl group and an acid inducing substance having a fluorine atom for an anion are provided in an electrolyte with the weight ratio of the acid inducing substance being in a range of 0.0001 to 2.0 wt % with respect to the sum of the weight of the electrolyte salt and the acid inducing substance:

Thereby, change of the characteristics of the electrochemical capacitor such as the capacitance and the internal resistance can be restrained while restraining the negative electrode electric potential change to be generated at the time of repeating the charge and discharge operations in a high voltage application condition.

INDUSTRIAL APPLICABILITY

The electrolyte of the present invention and the electrochemical capacitor using the same are useful in particular for a backup power source, regeneration, and the like, for hybrid motorcars, and fuel battery vehicles.

The invention claimed is:

1. An electrochemical capacitor comprising an element having a positive electrode with an electrode part mainly made of a polarizable electrode formed on a surface of an electric power collector made of a metal foil and a negative electrode with an electrode part mainly made of a carbon material occluding a lithium ion formed on the surface of an electric power collector made of a metal foil as a pair of electrodes wound or laminated in a state with a separator interposed between the positive electrode and the negative electrode facing with each other;
   an electrolyte; and
   an exterior member for storing the element and the electrolyte,
   wherein the electrolyte includes a solvent, an electrolyte salt represented by a following composition formula, and an acid inducing substance having a fluorine atom for an anion with a weight ratio of the acid inducing substance being in a range of 0.0001 to 2.0 wt % with respect to a sum of weight of the electrolyte salt and the acid inducing substance:

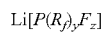

$\text{Li}[P(R_f)_y F_z]$ (wherein $R_f$ is a perfluoro alkyl group ($C_n F_{2n+1}$), n is a natural number, $1 \leq y < 6$, $1 \leq z < 6$).

2. The electrochemical capacitor according to claim 1, wherein the acid inducing substance has hydrolysis reactivity higher than that of the electrolyte salt.

3. The electrochemical capacitor according to claim 2, wherein the anion of the acid inducing substance includes at least one selected from a group consisting of $PF_6^-$, $BF_4^-$, $AsF_6^-$, and $SbF_6^-$.

4. The electrochemical capacitor according to claim 3, wherein the acid inducing substance includes at least one selected from a group consisting of $LiPF_6$, $LiBF_4$, $LiAsF_6$ and $LiSbF_6$.

5. The electrochemical capacitor according to claim 3, wherein the acid inducing substance includes at least one selected from a group consisting of tertiary ammonium salt, imidazolium salt, and tertiary phosphonium salt.

* * * * *